April 20, 1926.
C. A. COOK
1,581,390
EDUCATIONAL DEVICE
Filed Feb. 24, 1925
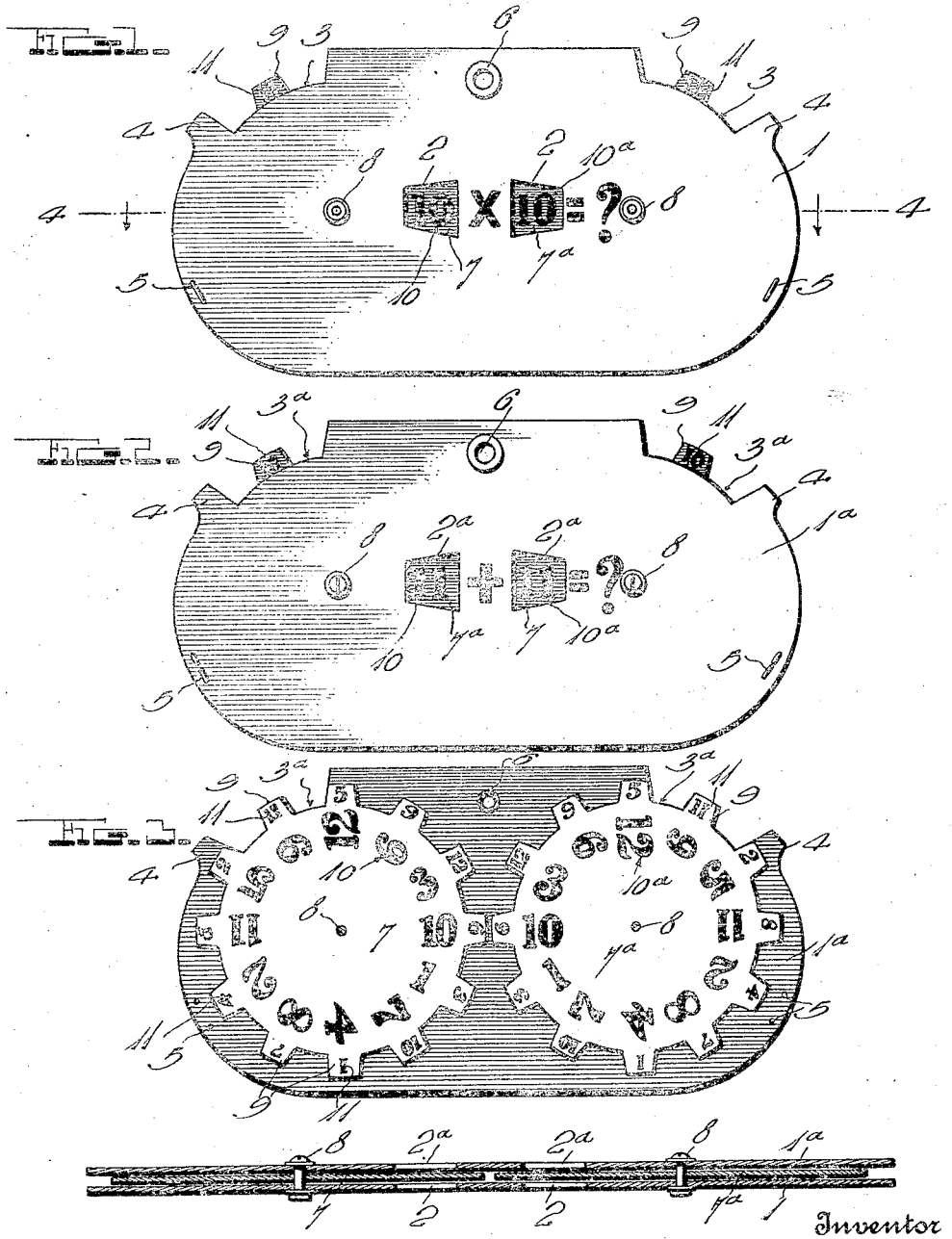
Witness
H. Woodard
Inventor
Cora A. Cook
By H. R. Wilmouter
Attorneys Patented Apr. 20, 1926.

1,581,390

UNITED STATES PATENT OFFICE.

CORA A. COOK, OF BRAINERD, MINNESOTA.

EDUCATIONAL DEVICE.

Application filed February 24, 1925. Serial No. 11,322.

*To all whom it may concern:*

Be it known that I, CORA A. COOK, a citizen of the United States, residing at Brainerd, in the county of Crow Wing and State of Minnesota, have invented certain new and useful Improvements in Educational Devices; and I do declare the following to be a full, clear, and exact description of the invention, such as will enable others skilled in the art to which it appertains to make and use the same.

My invention aims to provide an exceptionally simple, inexpensive and easily operable device which may be used to great advantage in the teaching of elementary arithmetic, the device being such that both the teacher and the pupils will benefit by its use.

With the foregoing in view, the invention resides in the novel subject matter hereinafter described and claimed, the description being supplemented by the accompanying drawing.

Figure 1 may be described as a front elevation and Figure 2 as a rear elevation, although the device is reversible and in some instances, what was previously the front, becomes the back.

Figure 3 is a front elevation with the front plate removed.

Figure 4 is a horizontal sectional view as indicated by line 4—4 of Fig. 1.

As above stated, the device herein disclosed is reversible, but for purposes of description and explanation, I have hereinafter referred to the front and back. The numeral 1 and the character 1ª designate respectively, duplicate front and back plates which are preferably formed of cardboard. These two plates are horizontally elongated and are each formed with a pair of substantially central view openings 2 and 2ª respectively. The upper portions of the two ends of the front and back plates 1 and 1ª have been shown as formed with additional openings 3 and 3ª, respectively, which openings are preferably in the form of notches, for a purpose to appear, and directly under these notches, said ends of the plates are formed with downwardly facing shoulders 4. Each of these notches 3ª is of a length corresponding to the distance between adjacent faces of alternate ears 9 so that when an operator places a finger on one edge of an ear and rotates the disks thereby until this particular edge is alined with one end wall of the notch 3ª, the next following ear will be centrally positioned between the ends of the notch. This movement also centrally positions a numeral or character 10 in one of the openings 7 or 7ª. The opposite ends of the device are adapted to be held between the user's hands and the shoulders 4 may rest upon certain fingers of the hand, leaving the thumbs free to operate within the notches 3 and 3ª, for the purpose of adjusting certain disks, hereinafter described.

The lower end portions of the plates 1 and 1ª are preferably secured together by staples or the like 5, and a grommet 6 is preferably passed through the central, upper portions of said plates, to be used when hanging the device up.

Disposed in a common plane between the front and back plates 1 and 1ª, are two flat disks 7 and 7ª which are preferably formed of cardboard, said disks being duplicates in all respects, in the preferred form of construction. The disks are mounted on suitable pivot bolts or the like 8 and the peripheries of these disks are provided with circumferentially spaced operating ears 9 adapted to be successively exposed in the notches 3 and 3ª, so that they may be readily engaged for turning the disks to any desired extent.

One side of each disk is printed with an annular series of numbers 10 while the opposite side of each disk is formed with an annular series of numbers 10ª. The two series of numbers 10 are identical with each other, and similarly, the two series of numbers 10ª are duplicates. The disks are arranged so that one side of one disk carries the series 10 and the same side of the other disk carries the series 10ª. Two of these numbers are intended to be simultaneously displayed through the openings 2 and at the same time, two of the other numbers will be positioned at the openings 2ª. Between the openings 2, a multiplication sign has been shown, and an addition sign illustrated between the openings 2ª, indicating that the numbers displayed at one side of the device are to multiplied, and that those at the other side are to be added. It will be understood however that the device could well be made for performing other operations, such as substraction and division.

Preferably printed upon the operating ears 9, are annular series of numbers which indicate to the teacher, behind the device, the numbers displayed at the openings at the front of said device. These additional series of numbers are indicated at 11 and it may be explained that the series on any one side of either of the disks is a duplicate of the series on the opposite side of the other disk. As this is also true of the numbers 10 and 10<sup>a</sup>, it will be seen that printing of the disks 7 and 7<sup>a</sup> is greatly simplified. It is only necessary to print the two disks as exact duplicates, the printing on one side however being different from that on the other side. Then, when placing the disks in the device, unlike sides are disposed in the same direction.

It will be seen that the device may be conveniently held between the user's hands with the shoulders 4 resting on certain fingers, leaving the thumbs free to operate the ears 9, within the notches 3 and 3<sup>a</sup>. The lower edge walls of these notches form stops to limit each successive turn of the disks, by coming in contact with the thumbs. Thus, whenever one or both ears are turned to the limit permitted, it is insured that the disk numbers shall be accurately located at the openings of the front and back plates.

The teacher holds the device in front of her when using it, and Fig. 1 may be considered as the manner in which the device is viewed by the class. Fig. 2 however, shows the view which the teacher then receives of the device and by looking at the numbers 11 on the ears 9, within the notches 3<sup>a</sup>, she knows the numbers which are displayed in the openings 2, to be seen by the class. This is also true if the entire device is reversed, so that the class sees the side previously viewed by the teacher, and vice versa.

The article is extremely simple and inexpensive, yet may be easily and advantageously used to display any desired combination of two numbers. Consequently, the device may well be used for teaching addition, substraction, multiplication or division, although it has only been illustrated for teaching multiplication and addition.

Excellent results have been obtained from the details disclosed and they are therefore preferably followed, but within the scope of the invention as claimed, other structures may well be used to advantage. At this point, it may be stated that if desired, the outer series of numbers 11 might well be omitted and other suitable provision made so that at one side of the device, the numbers displayed at the other side may be determined.

I claim:

1. An educational device comprising duplicate relatively long front and back plates having a pair of sight notches in the opposite ends and a pair of transverse sight openings relatively longitudinally spaced at the central portion, fixed relatively different arithmetical signs on opposite sides of the device between said centrally arranged transverse sight openings, a pair of disks disposed in a common plane between the plates and rotatably mounted upon spaced axes, radial ears at the peripheries of the disks, an inner and outer annular series of characters upon each side of each disk and its set of ears, the characters of the inner series being exposed one after another through the sight openings and the characters on the ears being exposed individually one after another through said sight notches, the characters of one series upon one side of a disk and the characters on the opposite side of the ears of the same disk being duplicate and relatively arranged so that similar characters will be simultaneously exposed through said sight openings in one side of the device and through corresponding sight notches in the other side of the device.

2. A structure as specified in claim 1; said sight notches being of a length corresponding to the distance between adjacent faces of alternate ears whereby with transverse alinement of one of said adjacent faces and an end wall of the notch, an ear carrying a single character of the outer series will be centrally arranged in each notch and a character of the inner series will be accurately positioned in the sight opening.

In testimony whereof I have hereunto affixed my signature.

CORA A. COOK.